Patented Feb. 7, 1939

2,146,594

UNITED STATES PATENT OFFICE 2,146,594

RUBBER INSULATING COMPOUND AND METHOD OF MAKING THE SAME

Manuel H. Savage and Francis C. Spargo, New Haven, and Emil W. Schwartz, Bridgeport, Conn., assignors to General Electric Company, a corporation of New York No Drawing. Application September 16, 1936, Serial No. 101,074

8 Claims. (Cl. 106—13)

The present invention relates broadly to an improved rubber insulating compound and to a method of making the same. More particularly it relates to, and has as a principal object to provide a rubber composition for insulating electrical conductors and cables that possesses improved resistance to aging and is heat-resisting at elevated temperatures, for example, at temperatures of the order of about 75° to 85° C., for a prolonged period of time. The characteristic heat-resisting and super-aging properties of our new and improved rubber insulating compound are due mainly to the particular ingredients and proportions thereof that are used in its manufacture.

Prior to this invention known rubber insulating compounds were not practically successful for insulating electrical conductors and cables operating at conductor temperatures ranging around 75° C., due to the excessive deteriorating action of such temperatures upon the insulation. The present invention obviates these practical difficulties.

The novel features which are characteristic of our invention are set forth in the appended claims. The invention itself, however, will best be understood from the following specification:

Rubber insulating compound produced in accordance with this invention comprises crude rubber such as new Hevea rubber of the grade known to the trade as "No. 1 smoked sheet rubber" and in an amount such, for instance, as about 33 per cent by weight, the remainder consisting of finely divided zinc oxide, finely divided inert filler, anti-oxidant, plasticizer and an organic accelerator capable of yielding nascent sulfur at vulcanization temperatures, for example, a thiuram polysulfide. More particularly, it consists essentially of materials of the kinds just described advantageously combined in the following proportions:

| | Parts by weight |
|---|---|
| Crude rubber | 33.0–38.0 |
| Finely divided zinc oxide | 28.0–33.0 |
| Finely divided inert filler | 26.0–31.0 |
| Anti-oxidant | 1.0– 3.0 |
| Plasticizer | 0.5– 2.5 |
| Thiuram polysulfide | 1.0– 2.5 |

If desired a small amount, for example, about 0.5 to 3.0 parts by weight, of carbon black, for instance such carbon blacks as those known to the trade as "P 33", "Gastex" and "Micronex" (and preferably the softer blacks such as "P 33" or "Gastex"), may be a part of the finely divided inert filler of the foregoing formula, the remainder of the inert filler advantageously being clay of a kind used in rubber compounding.

Fillers or filling materials are those substances in powder form that are incorporated in rubber compounds for the purpose of increasing the bulk of the compound. They are usually inert substances which generally produce strengthening effects on the vulcanized compound. In the preparation of rubber insulation for wires and cables, the kind and amount of filler have a material influence upon the properties of the end-product. Examples of inert fillers that may be used in practicing this invention are whiting, blanc fixe, clay and asbestine.

In rubber compounding certain finely divided substances or fillers which, when properly dispersed in rubber, provide the vulcanized product with improved physical properties, for example, greater energy of resilience, greater resistance to abrasion, higher modulus of elasticity and tensile strength, are often described as "reinforcing agents". Examples of such substances are zinc oxide, channel carbon black and so-called "soft blacks". Magnesium carbonate in an amount up to about 5 per cent by weight of the whole may also be used. Higher amounts of magnesium carbonate detrimentally affect the useful physical properties of a rubber compound, for example, by stiffening the compound excessively. Substances of the kind just stated comprise a part of the total filler content of the rubber compound produced by this invention. We use zinc oxide as one of such substances both to activate the particular thiuram polysulfide employed as an accelerator of vulcanization and to add strength and heat resistance to the end-product.

An anti-oxidant is a substance that inhibits or retards oxidation catalytically or by preferential absorption of oxygen. Anti-oxidants used in rubber compounding are usually of organic origin. Raw rubbers contain naturally occurring anti-oxidants but the amount present is too small to introduce super-aging properties into a rubber compound. Use of a synthetic anti-oxidant in practicing this invention aids in obtaining a rubber insulating compound of maximum super-aging and heat-resisting properties. Examples of such anti-oxidants that may be used in preparing our improved rubber insulating composition are those known to the trade as "Neozone D", "Neozone E", "Antox" and "B. L. E.". "Neozone D" is phenyl-beta-naphthylamine; "Neozone E" consists of about 75 per cent phenyl-beta-naphthylamine and about 25 per cent meta-toluylenediamine oxalate; "Antox" and "B. L. E." are aldehyde-amine reaction products.

An accelerator is any substance that hastens the vulcanization of rubber, causing it to take place in shorter time or at lower temperature or both. According to potency, or speed of action, accelerators are commonly classified by those skilled in the art as slow, medium, semi-ultra, and ultra accelerators. Thiuram polysulfides are commonly referred to in the trade as ultra accelerators, but actually they are rapid accelerators of vulcanization only in the presence of added sulfur. Thiuram polysulfides, for example, tetramethyl-thiuram disulfide, known to the trade as "Tuads", and di-pentamethylene-thiuram tetrasulfide, known to the trade as "Tetrone A", split off nascent sulfur at vulcanization temperatures. The rubber compound of this invention is therefore cured without the addition of any other free sulfur, producing vulcanizates that are non-tarnishing to metallic conductors and super-resistant to aging and heat. It is our theory that at least a part of the marked improvement in the useful properties of our rubber compound, for example, its outstanding heat-resisting characteristics, is due to the slow, uniform cure obtained by using a thiuram polysulfide in compounding. As a result the rubber continues to cure, and reaches an optimum cure, after the material is in service use.

Substances which soften a rubber compound and make it easier to mold or extrude are commonly known as plasticizers. Examples of plasticizers which may be used in practicing this invention, and which are mentioned for purpose of illustration only, are stearic acid, zinc laurate, vegetable oils such as palm oil, China-wood oil, linseed oil and the like, mineral oils and waxes, et cetera. Such substances also generally function as dispersing agent.

For plasticizing the rubber as a means for promoting the rapid and uniform dispersion of the solid ingredients throughout the mass, and as a lubricant of the dies during the application of the rubber compound to a conducting core by extrusion means, we have found a combination of paraffin wax and stearic acid to be particularly effective. Thus, in a formula such as the one immediately hereinafter given, that material which for brevity we herein collectively designate as "plasticizer" may consist of 1.0 part of paraffin wax and 0.25 part of stearic acid. Green ozokerite, after being strained to free it of impurities, is also a suitable plasticizer. It may be used either alone or mixed with paraffin wax. Thus we may use as a plasticizer a mixture of ozokerite and stearic acid, or a mixture of ozokerite, paraffin wax and stearic acid.

In order that our invention may be more fully understood and practiced by those skilled in the art to which it pertains the following specific example thereof is given, it being understood that it is merely illustrative in nature:

| | Parts by weight |
|---|---|
| No. 1 smoked sheet crude rubber | 36.0 |
| Finely divided zinc oxide | 28.0 |
| Finely divided clay | 25.0 |
| Finely divided whiting | 4.5 |
| Carbon black | 1.25 |
| Plasticizer | 1.25 |
| Anti-oxidant | 2.5 |
| Tetra-methyl-thiuram disulfide | 1.5 |

About 70 per cent of the total crude rubber of a particular batch is first ground in a suitable machine, for example, a Banbury mixer, for about 4 minutes. The other ingredients, except the remainder of the crude rubber and the tetra-methyl-thiuram disulfide, are put into the mixer and the mixing continued for another period of about 9 minutes. The remainder of the crude rubber is now added and the whole mixed for a further period, say, about 12 minutes. The mass is then mixed on a rubber mill for about 5 minutes, after which it is strained and then aged for a few days. When ready to use, the tetra-methyl-thiuram disulfide is added to the stock prepared in the manner described, and the whole thoroughly mixed on a mill.

The stock is extruded in well-known manner on conductors by means of standard tubing practice; or it may be sheeted on a calendar and applied in the form of a tape to any electrical conductor or cable which may be conveniently insulated by such means. The rubber insulation is then vulcanized in place on the conductor. In the case of a No. 14 (0.064 inch diameter) copper conductor covered with a 3/64-inch wall of rubber, the rubber compound may be vulcanized by employing, for example, a 45-minute rise to about 25 to 35 pounds steam pressure (130.5° to 138.3° C.) and a 45-minute cure at such steam pressure, plus or minus 15 minutes variation either in the time in reaching the desired curing temperature or in the time of curing at such temperature, or in both the time in reaching the curing temperature and in the time of curing thereat. As is well known to those skilled in the art, the time required for effectively curing rubber insulation in place on electrical conductors depends both upon the wall thickness of the rubber and the diameter of the conductor. The greater the wall thickness and the diameter of the conductor, the longer is the curing time required.

The composition of the rubber insulating compound hereinbefore described may be modified by substituting for ordinary crude rubber of commerce rubber that has been initially thermally plasticized (and therefore having its original internal structure substantially unimpaired), under super-atmospheric pressure, in contact with water and in an atmosphere of a non-oxidizing compressible fluid comprising water vapor, in accordance with such a procedure as, for example, the following:

Crude rubber such as No. 1 smoked sheet rubber, together with about 1 to 3 per cent by weight of the whole, of an anti-oxidant or a mixture of anti-oxidants, is passed through the rolls of a rubber mill until the anti-oxidant is uniformly dispersed through the rubber, after which the rubber is sheeted to any desired thickness and size. During this operation care is taken to prevent the rubber from becoming mechanically broken down, that is, from becoming plasticized by mechanical means. The reason for this precaution and, in fact, a main reason why it is desirable to have a non-mechanically plasticized rubber such as is provided by this treatment, is this: When rubber or a rubber compound is mechanically worked for a prolonged period the internal structure of the rubber is detrimentally affected. In other words, what appropriately may be described as the "nerve" of the rubber, and upon which the "life" of rubber or of a rubber compound is more or less dependent, is injured beyond repair by any known subsequent treatment.

The rubber sheets containing added synthetic anti-oxidant and of any convenient size and shape, for example, sheets 3 feet long by 2½ feet wide by ⅛ inch thick, are then placed in a suitable receptacle such as an iron tub for subsequent treatment.

In a particular instance two hundred pounds of rubber sheets were placed in a tub, with metal spacers of the same size as the rubber sheets between each sheet to prevent adhesion of the sheets during subsequent treatment. Sufficient water was added to completely cover the rubber. The tub was then placed in an autoclave. Superheated steam was turned into the autoclave and the temperature raised to about 150° C. within about 20 minutes and held at about that same temperature for about 1 hour and 30 minutes. The tub was removed from the autoclave and allowed to cool until it could be handled. The rubber was then passed through a mill to press out some of the water which it had absorbed while in the autoclave. The pressed rubber was sheeted and dried. Drying may be done in a chamber maintained at a temperature below about 100° C., for example, at a temperature of about 80° to 85° C. or by suitable vacuum drying methods.

Obviously, temperatures and periods of time other than those mentioned hereinabove by way of specific example may be employed in treating the rubber to thermally plasticize it. The particular conditions of treatment are dependent upon various influencing factors such, for example, as the particular characteristics of the original crude rubber and the degree of plasticity it is desired to impart to it. Any temperature sufficiently high and period of time sufficiently long which will result in a plasticized rubber of the improved characteristics herein mentioned may be used. If desired, in addition to steam, other non-oxidizing gases such, for instance, as hydrogen, nitrogen and carbon dioxide, may be introduced into the autoclave to form the gaseous atmosphere. It is essential, however, that water vapor be present at all or a substantial part of the compressible fluid.

A treatment such as the foregoing beneficially affects the useful properties of crude rubber. The workability of the rubber is improved without the aid of rubber softeners, such as stearic acid, paraffin and the like, and without prolonged grinding on rubber mills and the resultant harmful effects upon the rubber. The treatment improves properties of the rubber such, for instance, as elasticity, so that when it is mixed with other ingredients of rubber compounds the whole may be processed without detrimentally affecting, during the usual mechanical treatment, the internal structure of the rubber.

Thermally plasticized rubber may be used in making rubber compounds such, for instance, as those herein described and the formulas therefor given, without the addition of plasticizing agents. If desired, however, plasticizing agents of the kind and in the amounts hereinbefore set forth may be used with thermally plasticized rubber in making a rubber insulating compound.

Use in rubber compounding of rubber treated as aforedescribed, and which we define as "thermally plasticized" rubber, provides more rapid mixing of the ingredients, less power consumption for mixing, better dispersion in the mixer, smoother running during tubing, less heat generated on warming mills, and less danger of scorching. When such rubber is substituted for ordinary crude rubber in practicing this invention, the resultant rubber compound frequently shows even greater resistance to heat and aging than a product made with crude rubber not so treated.

In a divisional application Serial No. 170,242, filed October 21, 1937, we have made claims to a process of plasticizing rubber as above described.

The superior and characteristic properties of rubber compound produced in accordance with this invention will immediately be appreciated by those skilled in the art from the following description of the product, based on the results of tests made by methods approved by the trade:

A 2-inch mark on a 6-inch test piece of a rubber compound made as herein described stretches at least 400 per cent before breaking. The set in a 2-inch mark on a 6-inch test piece one minute after release is not greater than ⅜ inch. The initial tensile strength of the compound is at least about 1500 pounds per square inch. The procedures for making elongation, set and tensile strength tests are described under specification D-27-35T of the American Society for Testing Materials. The product conforms in all respects to the electrical requirements of a rubber insulation as set forth in said specification D-27-35T.

When a sample of vulcanized rubber compound produced in accordance with this invention has been subjected to a temperature of 120° C. in an air oven for a period of 120 hours, its tensile strength is at least about 1200 pounds per square inch and its elongation not less than about 300 per cent. When subjected to the Bierer-Davis oxygen-bomb test for 21 days under a pressure of 300 pounds per square inch and at 70° C., a sample shows a depreciation of not more than 25 per cent in elongation and in tensile strength.

The distinguishing and valuable properties of our rubber compounds are further shown by the following: When a sample of a vulcanized rubber composition of this invention is subjected to an air-bomb test for 20 hours under an air pressure of 80 pounds per square inch and at a temperature of about 126.7° C. (260° F.), it shows a depreciation from that of the original compound of not more than 25 per cent in elongation and in tensile strength. And when a product of this invention is placed in an air bomb and therein subjected to 80 pounds air pressure for five hours at about 148.9° C. (300° F.) its maximum depreciation from the original in elongation and in tensile strength, after this more rigid test, is likewise not more than 25 per cent. In making this test the bomb is preheated to the test temperature, the sample or samples placed therein, and the aging time recorded from the time the bomb reaches test temperature, which time is usually less than 10 minutes.

Tests such as those just described are tests the results of which are indicative of the useful life of a rubber compound or of its usefulness for a particular purpose. As those skilled in the art will understand, rubber compounds having the properties just described not only have increased usefulness in old applications but also utility in new fields.

The following more specific data are given as illustrative of the improved properties possessed by rubber compounds in accordance with this invention: rubber technologists and by which is commonly meant the power or capacity of a rubber compo-

*Oxygen-bomb test, 70° C., 300 lbs. per sq. in. pressure*

| Product | With wire | | | | Without wire | | | |
|---|---|---|---|---|---|---|---|---|
| | Tensile strength in lbs./sq. in. | Percent elongation | Percent depreciation— | | Tensile strength in lbs./sq. in. | Percent elongation | Percent depreciation— | |
| | | | In tensile strength | In elongation | | | In tensile strength | In elongation |
| Vulcanized rubber compound made in accordance with this invention | 2,352 | 430 | | | 2,343 | 430 | | |
| Same compound after 504 hours in oxygen bomb | 2,522 | 430 | +7.2 | 0 | 2,306 | 410 | 1.6 | 4.65 |
| Same compound after 960 hours in oxygen bomb | | | | | 1,750 | 390 | 25.3 | 9.32 |
| Ordinary vulcanized rubber insulating compound before testing | 1,643 | 420 | | | 1,643 | 420 | | |
| Same compound after 192 hours in oxygen bomb | 885 | 410 | 46.1 | 2.4 | 933 | 410 | 43.2 | 2.4 |

*Geer air oven test at 120° C. for 120 hours*

| Product | | | | | | | | |
|---|---|---|---|---|---|---|---|---|
| Vulcanized rubber compound made in accordance with this invention | 2,352 | 430 | | | | | | |
| Same compound after 120 hours in air oven | 1,857 | 430 | 21.0 | 0 | | | | |

*Geer air oven test at 75° C.*

| Product | | | | | | | | |
|---|---|---|---|---|---|---|---|---|
| Vulcanized rubber compound made in accordance with this invention | 2,352 | 465 | | | 2,352 | 465 | | |
| Same compound after 10 days in Geer oven at 75° C | 2,594 | 435 | +10.4 | 6.45 | 2,778 | 455 | +18.0 | 2.1 |
| Same compound after 20 days in Geer oven at 75° C | 2,620 | 425 | +11.4 | 7.75 | 2,778 | 450 | +18.0 | 3.2 |
| Same compound after 30 days in Geer oven at 75° C | 2,541 | 440 | +8.0 | 5.37 | 2,741 | 420 | +16.5 | 9.6 |
| Same compound after 40 days in Geer oven at 75° C | 2,573 | 430 | +9.4 | 7.5 | 2,573 | 425 | +9.4 | 8.6 |
| Ordinary vulcanized rubber insulating compound before testing | | | | | 1,646 | 460 | | |
| Same compound after 10 days in Geer oven at 75° C | | | | | 1,012 | 395 | 38.3 | 14.0 |
| Same compound after 20 days in Geer oven at 75° C | | | | | 717 | 375 | 56.5 | 18.5 |
| Same compound after 30 days in Geer oven at 75° C | | | | | 542 | 220 | 69.0 | 52.3 |
| Same compound after 40 days in Geer oven at 75° C | | | | | 475 | 140 | 71.0 | 69.5 |

*Air-bomb test at 126.7° C. (260° F.), under 80 lbs. air pressure for 20 hours*

| Product | | | | | | | | |
|---|---|---|---|---|---|---|---|---|
| Vulcanized rubber compound made in accordance with this invention | 2,160 | 420 | | | | | | |
| Same compound after 20 hrs. in air bomb at 126.7° C., 80 lbs. air pressure | 2,368 | 410 | +9.3 | 2.4 | | | | |

*Air-bomb test at 148.9° C. (300° F.), under 80 lbs. air pressure for 5 hours*

| Product | | | | | | | | |
|---|---|---|---|---|---|---|---|---|
| Vulcanized rubber compound made in accordance with this invention | 2,460 | 430 | | | | | | |
| Same compound after 5 hrs. in air bomb at 148.9° C. under 80 lbs. air pressure | 2,095 | 390 | 14.85 | 9.3 | | | | |

Because of its characteristic super-aging and heat-resisting properties, not heretofore combined in any known rubber compound used in insulating electrical conductors and cables, rubber insulation made by practicing this invention is especially adapted for use in manufacturing station and apparatus cables, transformer and motor leads, and for general power applications where the cable insulation may be subjected at times to temperatures of the order of about 75° to 85° C.

The term "heat-resisting" as used herein means that property of rubber compositions of resisting, for a prolonged period of time, the combined deteriorating action of heat and air to which such composition may be exposed. We use the term "super-aging" as in common usage by rubber technologists and by which is commonly meant the power or capacity of a rubber composition to resist deterioration to an outstanding degree. By the term "thermally plasticized crude rubber" as used hereinbefore and in the appended claims we mean the dried product of subjecting crude rubber containing added synthetic antioxidant to pressure substantially above atmospheric, while in contact with water and in an atmosphere of a non-oxidizing compressible fluid comprising water vapor, at a temperature sufficiently high and for a period sufficiently long to increase substantially the plasticity of the original crude rubber.

What we claim as new and desire to secure by Letters Patent of the United States, is:

1. A vulcanized rubber insulating compound which is the product of vulcanizing a mixture consisting essentially, by weight, of 33 to 38 parts thermally plasticized crude rubber; 28 to 33 parts finely divided zinc oxide, 26 to 31 parts finely divided inert filler, and not more than 8 parts of other rubber compounding substances, one of which is an antioxidant, and another of which is an organic compound capable of yielding nascent sulfur at vulcanization temperature, said rubber compound in a vulcanized state having an initial tensile strength of at least 1500 pounds per square inch and an initial elongation before breaking of at least 400 per cent, and showing a depreciation from that of the original vulcanized compound of not more than 25 per cent in elongation and in tensile strength after heating in an air-bomb for 20 hours under a pressure of 80 pounds per square inch at about 260° F. or after similarly heating for 5 hours under a pressure of 80 pounds per square inch at about 300° F.

2. A vulcanizable rubber insulating compound consisting essentially, by weight, of 33 to 38 parts thermally plasticized crude rubber, 28 to 33 parts finely divided zinc oxide, 26 to 31 parts finely divided clay, and 2.5 to 8 parts anti-oxidant, tetramethyl-thiuram disulfide and plasticized comprising stearic acid and paraffin, said compound in a vulcanized state having an initial tensile strength of at least 1500 pounds per square inch and an initial elongation of at least 400 per cent before breaking, and showing a depreciation from that of the original vulcanized compound of not more than 25 per cent in elongation and in tensile strength after heating in an air-bomb for 20 hours under a pressure of 80 pounds per square inch at about 260° F. or after similarly heating for 5 hours under a pressure of 80 pounds per square inch at about 300° F.

3. A vulcanized rubber insulating compound having an initial tensile strength of at least 1500 pounds per square inch and an initial elongation of at least 400 per cent before breaking, and showing a depreciation from that of the original compound of not more than 25 per cent in elongation and in tensile strength after heating in an air-bomb for 20 hours under a pressure of 80 pounds per square inch at about 260° F. or after similarly heating for 5 hours under a pressure of 80 pounds per square inch at about 300° F., said compound being the product of heating a mix consisting essentially of the following ingredients within the stated range of proportions:

| | Parts by weight |
|---|---|
| Thermally plasticized crude rubber | 33.0–38.0 |
| Finely divided zinc oxide | 28.0–33.0 |
| Finely divided clay | 26.0–31.0 |
| Anti-oxidant | 1.0– 3.0 |
| Plasticizer | 0.5– 2.5 |
| Thiuram polysulfide | 1.0– 2.5 |

4. A vulcanized rubber compound having an initial tensile strength of at least 1500 pounds per square inch and an initial elongation of at least 400 per cent before breaking, and showing a depreciation from that of the original compound of not more than 25 per cent in elongation and in tensile strength after heating in an air-bomb for 20 hours under a pressure of 80 pounds per square inch at about 260° F., said compound being the product of heating at vulcanization temperature a mixture composed essentially of the following ingredients within the stated range of proportions:

| | Parts by weight |
|---|---|
| Thermally plasticized crude rubber | 33.0–38.0 |
| Finely divided zinc oxide | 28.0–33.0 |
| Finely divided inert filler | 26.0–31.0 |
| Anti-oxidant | 1.0– 3.0 |
| Plasticizer | 0.5– 2.5 |
| Tetra-methyl-thiuram disulfide | 1.0– 2.5 |

5. An insulated electrical conductor comprising a conducting core insulated with a vulcanized rubber insulating compound having an initial tensile strength of at least 1500 pounds per square inch and an initial elongation of at least 400 per cent before breaking, and showing a depreciation from that of the original compound of not more than 25 per cent in elongation and in tensile strength after heating in an air-bomb for 20 hours under a pressure of 80 pounds per square inch at about 260° F. or after similarly heating for 5 hours under a pressure of 80 pounds per square inch at about 300° F., said compound being the product of vulcanizing a vulcanizable rubber compound composed essentially, by weight, of 33 to 38 parts thermally plasticized crude rubber, 28 to 33 parts finely divided zinc oxide, 26 to 31 parts finely divided inert filler, and not more than 8 parts of other rubber compounding substances, one of which is an anti-oxidant and another of which is an organic compound capable of yielding nascent sulfur at vulcanization temperature.

6. An insulated electrical conductor comprising in combination a metallic conductor and an insulating rubber covering obtained by vulcanizing a mixture consisting essentially of the following ingredients within the stated range of proportions:

| | Parts by weight |
|---|---|
| Thermally plasticized crude rubber | 33.0–38.0 |
| Finely divided zinc oxide | 28.0–33.0 |
| Finely divided clay | 26.0–31.0 |
| Anti-oxidant | 1.0– 3.0 |
| Plasticizer | 0.5– 2.5 |
| Tetra-methyl-thiuram disulfide | 1.0– 2.5 | said covering having an initial tensile strength not less than 2000 pounds per square inch and an initial elongation not less than 400 per cent before breaking, and showing a depreciation from that of the original compound of not more than 25 per cent in elongation and in tensile strength after heating in an air-bomb for 20 hours under a pressure of 80 pounds per square inch at about 260° F. or after similarly heating for 5 hours under a pressure of 80 pounds per square inch at about 300° F.

7. A process of making a vulcanized rubber insulating compound having an initial tensile strength of at least 1500 pounds per square inch and an initial elongation of at least 400 per cent before breaking, and showing a depreciation from that of the original compound of not more than 25 per cent in elongation and in tensile strength after heating in an air-bomb for 20 hours under a pressure of 80 pounds per square inch at about 260° F. or after similarly heating for 5 hours under a pressure of 80 pounds per square inch at about 300° F., said process comprising forming a substantially uniform mixture consisting essentially, by weight, of 33 to 38 parts thermally plasticized crude rubber, 28 to 33 parts zinc oxide, 26 to 31 parts finely divided clay, 1 to 3 parts anti-oxidant and 1 to 2.5 parts of an organic compound capable of yielding nascent sulfur at vulcanization temperature, and heating the resulting compound at a temperature and for a period of time sufficient to vulcanize said compound.

8. A process of insulating an electrical conductor with a vulcanized rubber compound having an initial tensile strength of at least 1500 pounds per square inch and an initial elongation of at least 400 per cent before breaking, and showing a depreciation from that of the original compound of not more than 25 per cent in elongation and in tensile strength after heating in an air-bomb for 20 hours under a pressure of 80 pounds per square inch at about 260° F. or after similarly heating for 5 hours under a pressure of 80 pounds per square inch at about 300° F., said process comprising forming a substantially uniform mixture composed essentially, by weight, of 33 to 38 parts thermally plasticized crude rubber, 28 to 33 parts finely divided zinc oxide, 26 to 31 parts finely divided clay, 1 to 3 parts antioxidant and 0.5 and 2.5 parts plasticizer, aging the said mixture, incorporating into the aged mixture 1 to 2.5 parts tetra-methyl-thiuram disulfide, applying the resulting rubber compound to an electrical conductor as insulation therefor, and vulcanizing the rubber in place on the conductor.

MANUEL H. SAVAGE.
FRANCIS C. SPARGO.
EMIL W. SCHWARTZ.

CERTIFICATE OF CORRECTION.

Patent No. 2,146,594. February 7, 1939.

MANUEL H. SAVAGE, ET AL.

It is hereby certified that error appears in the printed specification of the above numbered patent requiring correction as follows: Page 2, first column, line 41, for "agent" read agents; page 3, second column, line 12, for "acocrdance" read accordance; page 5, first column, line 23, claim 2, for "plasticized" read plasticizer; and that the said Letters Patent should be read with this correction therein that the same may conform to the record of the case in the Patent Office.

Signed and sealed this 11th day of April, A. D. 1939.

Henry Van Arsdale (Seal) Acting Commissioner of Patents.

showing a depreciation from that of the original compound of not more than 25 per cent in elongation and in tensile strength after heating in an air-bomb for 20 hours under a pressure of 80 pounds per square inch at about 260° F. or after similarly heating for 5 hours under a pressure of 80 pounds per square inch at about 300° F., said process comprising forming a substantially uniform mixture composed essentially, by weight, of 33 to 38 parts thermally plasticized crude rubber, 28 to 33 parts finely divided zinc oxide, 26 to 31 parts finely divided clay, 1 to 3 parts antioxidant and 0.5 and 2.5 parts plasticizer, aging the said mixture, incorporating into the aged mixture 1 to 2.5 parts tetra-methyl-thiuram disulfide, applying the resulting rubber compound to an electrical conductor as insulation therefor, and vulcanizing the rubber in place on the conductor.

MANUEL H. SAVAGE.
FRANCIS C. SPARGO.
EMIL W. SCHWARTZ.

CERTIFICATE OF CORRECTION.

Patent No. 2,146,594.　　　　　　　　　　　　　　　　　February 7, 1939.

MANUEL H. SAVAGE, ET AL.

It is hereby certified that error appears in the printed specification of the above numbered patent requiring correction as follows: Page 2, first column, line 41, for "agent" read agents; page 3, second column, line 12, for "acocrdance" read accordance; page 5, first column, line 23, claim 2, for "plasticized" read plasticizer; and that the said Letters Patent should be read with this correction therein that the same may conform to the record of the case in the Patent Office.

Signed and sealed this 11th day of April, A. D. 1939.

Henry Van Arsdale (Seal)　　　　　　　　　　　　　　　　　　Acting Commissioner of Patents.